United States Patent [19]

Higashimata et al.

[11] Patent Number: 5,161,865
[45] Date of Patent: Nov. 10, 1992

[54] HYDRAULIC MODULATOR WITH WORKING PISTON CONNECTED TO CONTROL PISTON

[75] Inventors: Akira Higashimata; Takeshi Fujishiro; Shigeki Yoshioka, all of Kanagawa, Japan

[73] Assignee: Nisson Motor Co., Ltd., Yokohama, Japan

[21] Appl. No.: 674,914

[22] Filed: Mar. 26, 1991

[30] Foreign Application Priority Data

Mar. 28, 1990 [JP] Japan .................................... 2-76698

[51] Int. Cl.⁵ .............................. F15B 5/00; B60T 8/32
[52] U.S. Cl. .............................. 303/115.2; 303/115.5; 303/116.1; 303/119.2; 60/545; 60/567; 60/59
[58] Field of Search ................... 303/113 TR, 115 EC, 303/115 FM, 115 PP, 119 R, 119 SV; 60/591, 545, 567, 569

[56] References Cited

U.S. PATENT DOCUMENTS

| | | | |
|---|---|---|---|
| 3,549,210 | 12/1970 | Birge et al. | 303/115 EC |
| 3,677,002 | 7/1972 | Fulmer | 60/545 X |
| 3,871,497 | 3/1975 | Bessiere | 60/545 X |
| 3,953,082 | 4/1976 | Smith | 303/100 |
| 4,206,605 | 6/1980 | Mehren et al. | 60/545 |
| 4,560,210 | 12/1985 | Tani et al. | 60/545 X |
| 4,578,951 | 4/1986 | Belart et al. | 60/545 |
| 4,755,946 | 7/1988 | Lin | 303/DIG. 4 X |
| 4,758,054 | 7/1988 | Brown | 303/111 X |
| 4,861,116 | 8/1989 | Bernhardt et al. | 303/100 |
| 4,865,398 | 9/1989 | Takeuchi et al. | 60/579 X |
| 4,877,296 | 10/1989 | Leiber et al. | 303/115 PP X |

FOREIGN PATENT DOCUMENTS

| | | |
|---|---|---|
| 2330683 | 1/1974 | Fed. Rep. of Germany ...... 303/119 SV |
| 3832538 | 3/1990 | Fed. Rep. of Germany . |
| 51-6308 | 2/1976 | Japan . |
| 56-254 | 1/1981 | Japan . |
| 0162357 | 7/1988 | Japan .............................. 303/116 SP |
| 1441901 | 7/1976 | United Kingdom ......... 303/119 SV |
| 2120337 | 11/1983 | United Kingdom ........ 303/115 FM |

*Primary Examiner*—Matthew C. Graham
*Assistant Examiner*—Josie A. Ballato
*Attorney, Agent, or Firm*—Foley & Lardner

[57] ABSTRACT

A system for controlling a fluid pressure such a brake fluid pressure of a vehicle includes a pressure control cylinder having a control piston for varying a pressure of a confined fluid, and a motor for producing a mechanical force for actuating the control piston. To reduce the load of the motor, a hydraulic assist circuit is interposed between the motor and the control piston. The hydraulic assist circuit creates a hydraulic assist pressure by receiving the force of the motor, and converting the assist pressure into a linear motion of the control piston. The mechanical force of the motor is converted to hydraulic assist pressure through a pressurizing piston. The hydraulic assist pressure created by the pressurizing piston is exerted against a working piston. The working piston is connected to the control piston. A reduced motor load is obtained by making the area of the working piston larger than the area of the control piston, and the area of the control piston larger than the area of the pressurizing piston.

18 Claims, 11 Drawing Sheets

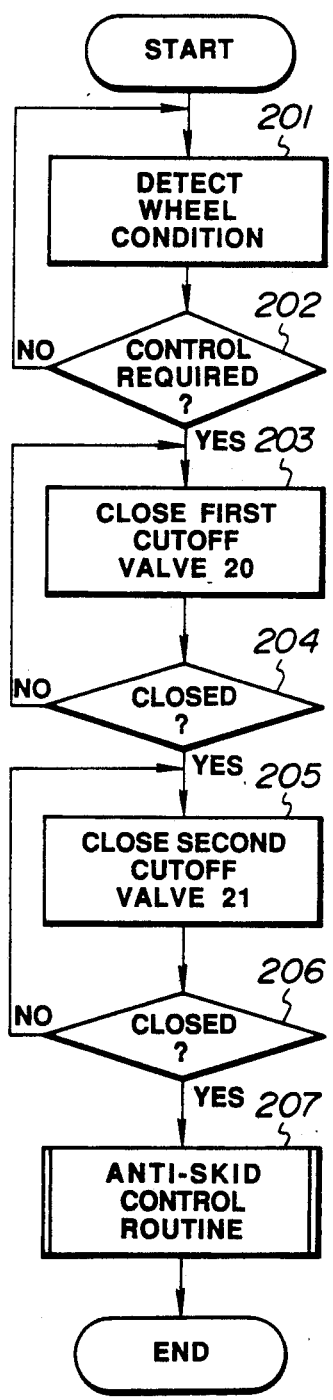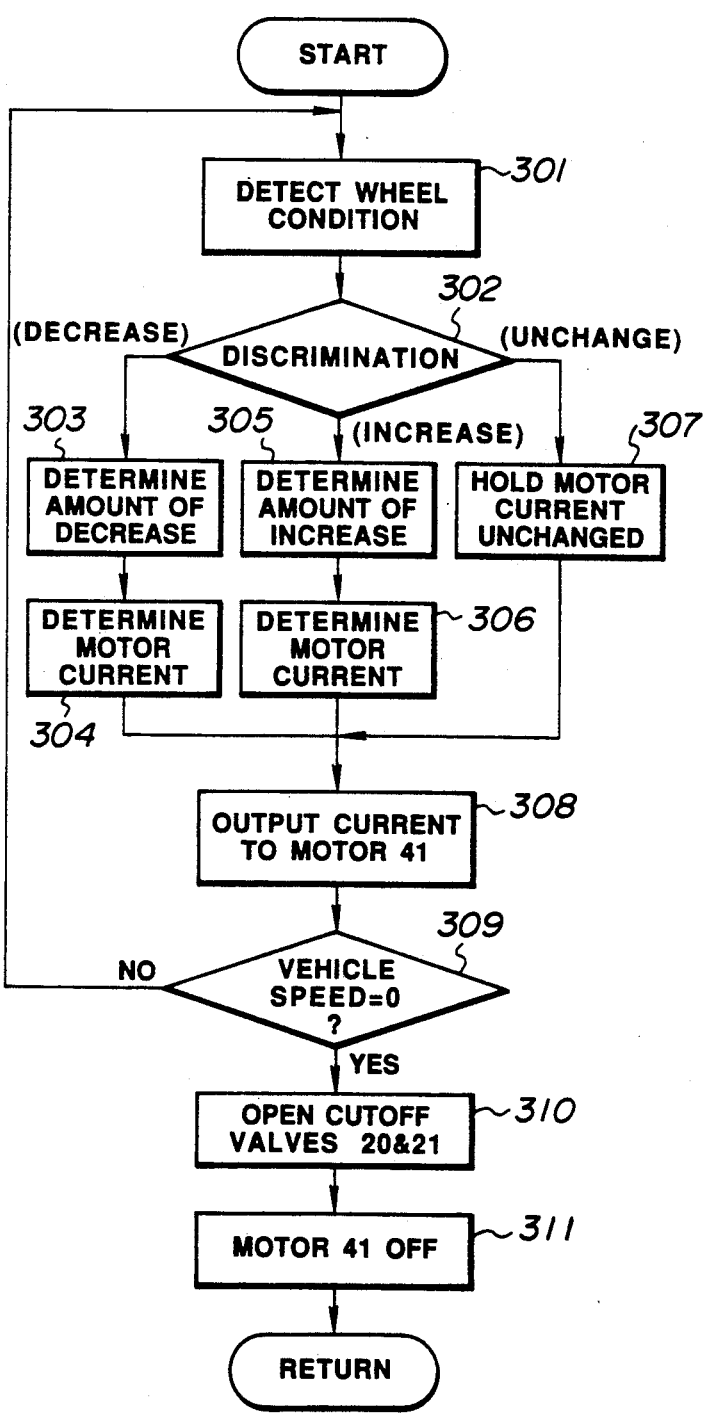

HYDRAULIC MODULATOR WITH WORKING PISTON CONNECTED TO CONTROL PISTON

BACKGROUND OF THE INVENTION

The present invention relates to a system for controlling a fluid pressure, and more specifically to a pressure control system which is suitable for an anti-skid brake control and/or a traction control of a motor vehicle.

Similar fluid pressure control systems are disclosed in a pending U.S. patent application Ser. No. 07/645,415, filed on Jan. 24, 1991 in the name of Akira HIGASHIMATA et al. with a claim for priority based on a Japanese Patent Application No. 2-13672.

Japanese Patent (post examination) Publication No. 56-254 discloses a conventional anti-skid brake pressure control system. This system normally allows a fluid pressure to flow from a pressure source such as a master cylinder to a hydraulic actuator such as a wheel cylinder. When it becomes impossible to properly control the actuator with the fluid pressure of the pressure source, the control system interrupts the fluid communication between the pressure source and the actuator, and controls the fluid pressure supplied to the actuator, independently of the pressure of the pressure source, with a hydraulic modulator. This modulator uses a ball valve for disconnecting the wheel cylinder and the master cylinder, and a pneumatic diaphragm mechanism for operating the ball valve and modulating the fluid pressure of the wheel cylinder. In this conventional system, however, the pneumatic circuit including an air pump is complicated and expensive, and the use of the diaphragm makes it difficult to reduce the size of the system.

SUMMARY OF THE INVENTION

It is an object of the present invention to provide a fluid pressure control system, or a hydraulic modulator, which can control a fluid pressure with a relatively small force.

According to the present invention, a fluid pressure control system comprises a pressure control cylinder means, a drive means, and an assist means. The pressure control cylinder means controls a pressure of a confined fluid, and comprises a control cylinder housing defining a first control fluid chamber, and a control piston for varying the volume of the first control chamber to control the pressure. The drive means produces a first mechanical force. The drive means may include a motor means for converting electric energy into mechanical energy. The motor means may comprise an electric motor, or a solenoid for producing a linear motion. The assist means produces an assist hydraulic pressure by receiving the first mechanical force from the drive means, converts the assist hydraulic pressure into a second mechanical force, and applies the second mechanical force on the control piston to move the control piston. In illustrated embodiments of the invention, the assist means is in the form of a hydraulic press. The assist means of the invention is simple in construction, compact, and inexpensive. Furthermore, the assist means can reduce the load of the drive means.

BRIEF DESCRIPTION OF THE DRAWINGS

FIGS. 2 and 3 are flowcharts showing a control program performed by a controller shown in FIG. 1.

DETAILED DESCRIPTION OF THE INVENTION

Figure 1:
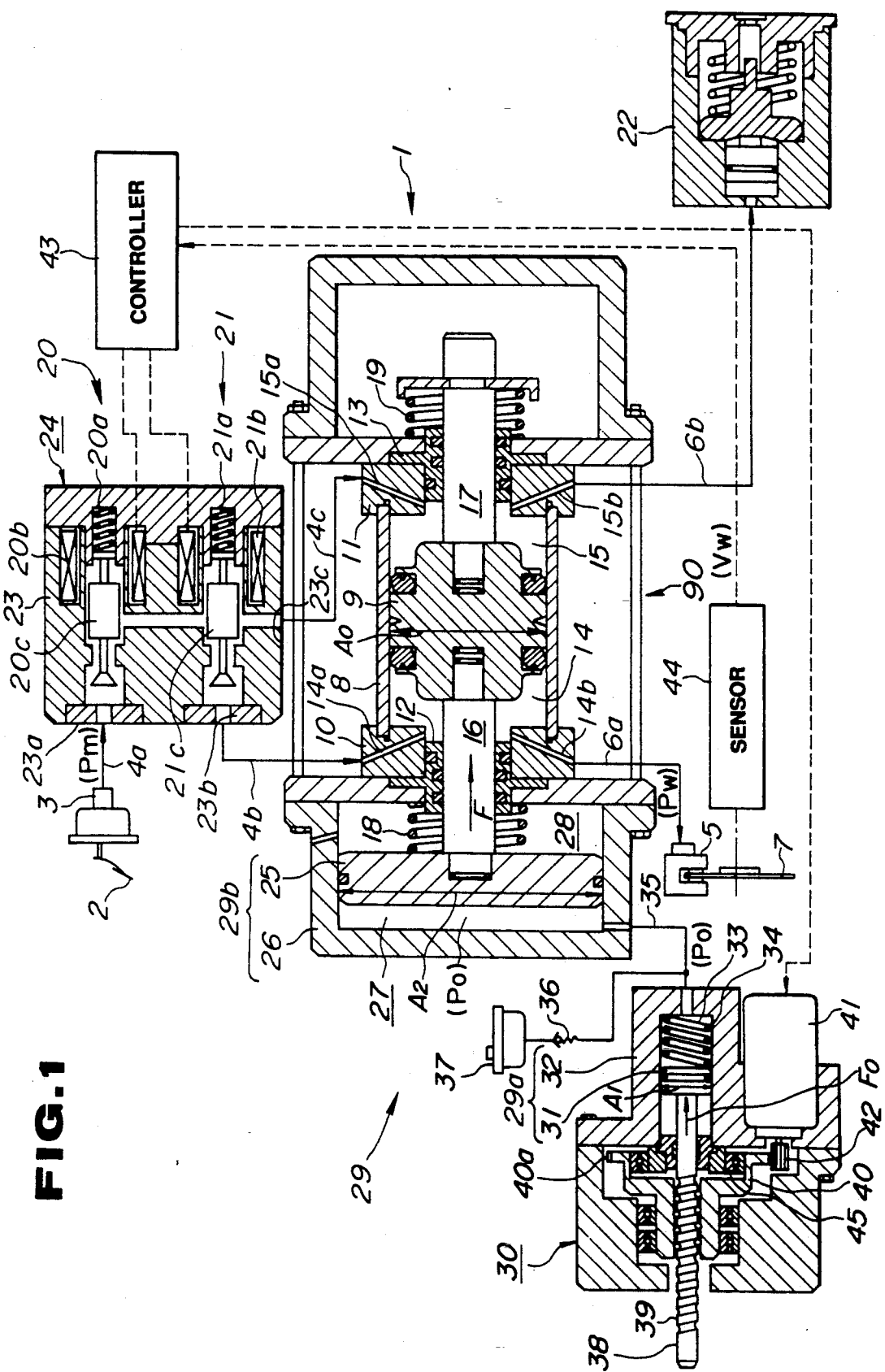
FIG. 1 is a sectional view showing a fluid pressure control system according to a first embodiment of the present invention.

A first embodiment of the present invention is shown in FIGS. 1, 2 and 3. A fluid pressure control system shown in FIG. 1 includes an anti-skid brake control modulator (or anti-skid actuator) 1 for adjusting brake actuation force of a wheeled vehicle such as an automobile. The fluid pressure control system of this embodiment is an anti-skid brake control system (or wheel slip brake control system) which automatically controls the degree of rotational wheel slip during braking.

The fluid pressure control system of this embodiment further includes a brake pedal 2, a master cylinder 3, a fluid pressure conductor means defining a brake fluid supply passage 4a, at least one wheel cylinder 5, and a fluid pressure conductor means defining first and second brake fluid outlet branch passages 6a and 6b. The master cylinder 3 delivers a fluid pressure Pm in accordance with a brake pedal force applied by the driver on the brake pedal 2. The master cylinder 3 is a primary unit for displacing hydraulic fluid under pressure in the brake system, and serves as a fluid pressure source or a fluid pressure supplying means. The brake fluid supply passage 4a is a brake line for transmitting the master cylinder fluid pressure Pm from the master cylinder 3 to the anti-skid hydraulic modulator 1. The anti-skid modulator 1 receives the master cylinder pressure Pm as an input pressure, and delivers an output pressure Pw to the wheel cylinder 5 through the first outlet branch passage 6a. The wheel cylinder 5 is a main hydraulic actuator for converting hydraulic fluid pressure to mechanical force for actuation of the brake. The wheel cylinder 5 of this embodiment is arranged to retard, stop and hold a braking disc or rotor 7 which is connected with one wheel of the vehicle so that the braking disc 7 rotates together with the wheel.

The hydraulic modulator 1 includes a cylinder member 8 and a pressure control piston 9 which is slidably received in a bore of the cylinder member 8. Both ends of the bore of the cylinder member 8 are closed, respectively, by first and second end plug members 10 and 11, and first and second bearing seal members 12 and 13. First and second control fluid chambers 14 and 15 are formed on both sides of the control piston 9 by the cylinder member 8 and the first and second end members 10 and 11. In this embodiment, the cylinder member 8, and the first and second end members 10 and 11 serve as a control cylinder housing defining the first and second control fluid chambers 14 and 15 which are separated by the control piston 9. First and second piston rods 16 and 17 are attached to the piston 9. The first and second piston rods 16 and 17 extend in the opposite directions from the opposite sides of the piston 9. The first piston rod 16 is tightly received and slidably supported by the first seal member 12 so that the first fluid chamber 14 is sealed and the first piston rod 16 is axially slidable. Similarly, the second piston rod 17 is tightly received and slidably supported by the second seal member 13. A first return spring 18 is provided for applying a biasing force on the first piston rod 16 to push the piston rod 16 in the leftward direction as viewed in FIG. 1. A second return spring 19 is provided for applying a biasing force on the second piston rod 17 to push the second piston rod 17 in the rightward direction in FIG. 1. The first and second return springs 18 and 19 resiliently hold the control piston 9 in a neutral position shown in FIG. 1. In this embodiment, the volumes of the first and second control chambers 14 and 15 are equal to each other when the control piston 9 is in the neutral position. The first and second return springs 18 and 19 serve as a spring means for holding the control piston 9 in the neutral position. In this embodiment, the first piston rod 16 projects out of the first chamber 14, and the first return spring 18 is disposed between the projecting end of the first piston rod 16, and the stationary cylinder housing. Similarly, the second piston rod 17 projects out of the second chamber 15, and the second return spring 19 is disposed outside the second chamber 15. In this embodiment, the cylinder member 8, the control piston 9 and the other members 12, 13, 16, 17, 18 and 19 constitute a fluid pressure control cylinder assembly (or means) 90 for modulating the fluid pressure.

The hydraulic modulator 1 further includes a cutoff valve assembly (or means) 24 which, in this embodiment, comprises first and second cutoff valves 20 and 21. In this embodiment, the first and second cutoff valves 20 and 21 are connected in series, and the series circuit of the valves 20 and 21 is interposed between the master cylinder 3 and the first control fluid chamber 14 of the cylinder assembly 90. The master cylinder 3 is fluidly connected with the first control fluid chamber 14 through the cutoff valves 20 and 21. On the other hand, the second control fluid chamber 15 is fluidly connected with the master cylinder 3 through the first cutoff valve 20. The cutoff valve assembly 24 has a valve housing 23 which is formed with an inlet port 23a, a first outlet port 23b and a second outlet port 23c. Each of the first and second cutoff valves 20 and 21 has a spring 20a or 21a, a solenoid 20b or 21b, and a movable valve element 20c or 21c. Each cutoff valve 20 or 21 is normally held open by the action of the spring 20a or 21a, and closed by the solenoid 20b or 21b when the solenoid is energized. The inlet port 23a is connected with the master cylinder 3 by the master cylinder pressure supply passage 4a. The first outlet port 23b is connected with the first control fluid chamber 14 by a first inlet branch passage 4b. The second outlet port 23c is connected with the second control chamber 15 by a second inlet branch passage 4c.

The first control fluid chamber 14 is connected with the wheel cylinder 5 by the first outlet branch passage 6a, and the second control fluid chamber 15 is connected with a hydraulic accumulator 22 by the second outlet branch passage 6b. The housing of the cylinder assembly 90 is formed with a first inlet port 14a connected with the first inlet branch passage 4b, a second inlet port 15a connected with the second inlet branch passage 4c, a first outlet port 14b connected with the first outlet branch passage 6a, and a second outlet port 15b connected with the second outlet branch passage 6b. Each of the first inlet and outlet ports 14a and 14b opens into the first control chamber 14, and each of the second inlet and outlet ports 15a and 15b opens into the second control chamber 15.

The hydraulic modulator 1 further includes an assist means 29 and a drive means 30. The drive means 30 is a source of mechanical power, and produces an external physical force which is applied to the assist means 29. The assist means 29 produces an assist hydraulic pressure by receiving the external force from the drive means 30, and converts the assist pressure into a mechanical force which is applied on the control piston. In this embodiment, the assist means 29 includes a first hydraulic means 29a for producing the assist hydraulic pressure $P_0$, and a second hydraulic means 29b for imparting linear motion to the control piston 9.

The second hydraulic means 29b comprises a working piston (or power piston) 25, and a working (or power) cylinder housing 26. The working piston 25 is attached to the projecting end of the first piston rod 16. The working piston 25 and the control piston 9 are connected by the first piston rod 16 so that both pistons axially move as a unit. The working cylinder housing member 26 is fixed to the first end member 10 of the control cylinder assembly 90. The working piston 25 is slidably received in the bore of the working cylinder housing member 26. The working cylinder housing 26 defines a first working fluid chamber (power chamber) 27 and a reference pressure chamber 28 which are separated by the working piston 25. In this embodiment, the reference pressure chamber 28 is an atmospheric pressure chamber. A diameter of the cylindrical working piston 25 is greater than that of the cylindrical control piston 9. The assist hydraulic pressure $P_0$ is supplied to the working chamber 27.

In this embodiment, the first means 29a for producing the assist pressure $P_0$ comprises a pressurizing piston 31, and a pressurizing cylinder housing 32. A diameter of the cylindrical pressurizing piston 31 is smaller than the diameter of the control piston 9. The pressurizing piston 31 is slidably received in the bore of the cylinder housing 32 to define a pressurizing fluid chamber 33. A spring 34 is disposed in the cylinder housing 32, and arranged to push the pressurizing piston 31 in such a direction as to increase the volume of the pressurizing chamber 33. The pressurizing chamber 33 is fluidly connected with the working chamber 27 by an assist pressure passage 35. Thus, the first and second hydraulic means 29a and 29b are combined so that they function as a hydraulic press. A fluid reservoir 37 is connected through a check valve 36 to an intermediate tap point of the assist pressure passage 35 between both ends of the passage 35. The reservoir 37 can replenish the assist hydraulic circuit with the hydraulic fluid.

The drive means 30 of this embodiment is a motor means for converting electric energy into mechanical energy. In this embodiment, the drive means 30 comprises an electric rotary motor (or torque motor) 41, such as a DC motor, and a gear arrangement. A piston rod 38 is attached to the pressurizing piston 31. The piston rod 38 has a projecting portion which is formed with a ball screw 39, and which is received in a ball screw nut member 40. The ball nut member 40 is supported by a bearing 46 in such a manner that the ball nut member 40 is rotatable but it is immovable in the axial direction of the piston rod 38. The ball nut member 40 has external gear teeth 40a which are engaged with the teeth of a pinion 42 which is drivingly connected with the electric motor 41. The gear arrangement of this embodiment is composed of the projecting portion of the piston rod 38 in the form of a ball screw rod, the ball nut 40 and the pinion 42. This gear arrangement varies the speed of rotation transmitted therethrough, converts rotational motion into translational motion, and applies a mechanical force to the pressurizing piston 31.

The fluid pressure control system of this embodiment further includes a controller means comprising an anti-skid electronic logic controller 43, and a sensor means comprising at least one wheel sensor 44. The controller 43 is electrically connected with the wheel speed sensor 44 to receive a sensor signal, and further connected with the first and second cutoff valves 20 and 21, and the motor 41 to control these components by sending control signals. The sensor means is a means for sensing one or more operating conditions of the vehicle, and providing the controller 43 with information required for various operations of the controller 43. The wheel speed sensor 44 senses a peripheral speed Vw of the associated wheel of the vehicle, and sends a wheel speed signal to the controller 43.

The controller 43 performs a control program shown in FIGS. 2 and 3, and regulates (or modulates) the brake fluid pressure Pw so as to prevent a wheel skid condition and provide an optimum braking performance especially in an emergency or panic stop situation.

At a first step 201 shown in FIG. 2, the controller 43 detects a revolving condition of the wheel. For example, the controller 43 calculates the degree of wheel slip S, and an acceleration or deceleration of the wheel. The wheel slip degree (or wheel slip rate) S is equal to a quotient obtained by diving dividing a difference between the wheel speed Vw and a vehicle body speed Vc, by the body speed. That is, $S=(Vc-Vw)/Vc$. It is possible to determine the vehicle body speed Vc from the wheel speed Vw in a known manner.

At a second step 202, the controller 43 determines whether the vehicle is in a state requiring the anti-skid control. For example, the controller 43 makes a decision by checking whether the wheel slip degree S is equal to or greater than a predetermined reference (threshold) value So (which is normally set equal to a value of the wheel slip degree, such as 0.15, at which the friction coefficient between the wheel and road surface becomes maximum), and checking whether the wheel is in an accelerating condition or in a decelerating condition. If the anti-skid control is not required, then the controller 43 returns from the step 202 to the step 201. If the answer of the step 202 is affirmative, then the controller 43 proceeds to steps 203-206, and closes the first and second cutoff valves 20 and 21 by energizing the solenoids 20b and 21b. Then, the controller 43 proceeds to a step 207, and enters an anti-skid control routine. In this embodiment, the controller 43 first closes the first cutoff valve 20 at the step 203, and then closes the second cutoff valve 21 at the step 205. Therefore, the first and second control fluid chambers 14 and 15 are first isolated from the pressure source 3 by the first cutoff valve 20. In this state, the fluid pressures on both sides of the control piston 9 are made equal to each other. Thereafter, both control chambers 14 and 15 are isolated from each other by the second cutoff valve 21. Thus, the pressure control system of this embodiment ensures the initial balance of fluid pressures on both sides of the control piston 9.

Therefore, when the wheel is free from wheel slip, both of the first and second cutoff valves 20 and 21 are in the off state to open the respective fluid passages, and the motor 41 is in the off state to allow the return springs 18 and 19 to hold the control piston 9 in the neutral position. In this normal operating state, the master cylinder pressure Pm is transmitted through the cutoff valves 20 and 21, and the first control chamber 14, to the wheel cylinder 5, so that the normal braking operation is ensured. On the other hand, the master cylinder pressure Pm reaches the second control fluid chamber 15 through the first cutoff valve 20, so that the fluid pressure in the second control chamber 14 is held equal to the pressure of the first control chamber 14.

FIG. 3 shows the anti-skid control routine executed after the closure of the first and second cutoff valves 20 and 21. First, the controller 43 detects the condition of the wheel at a step 301 in the same manner as in the step step 201. At a next step 302, the controller 43 makes a choice among three possible courses of action to hold the slip degree near the ideal value, by checking the wheel condition. If the brake fluid pressure Pw is to be held unchanged, the controller 43 takes an action required to hold a current of the motor 41 unchanged at a step 307. If the brake pressure Pw is to be increased, the controller 43 determines an amount of pressure increase, at a step 305, and determines the motor current to attain the pressure increase, at a step 306. If the pressure is to be decreased, the controller 43 determines an amount of pressure decrease at a step 303, and determines the motor current at a step 304. Then, the controller 43 outputs, at a step 308, the motor current determined at the step 304, 306 or 307, and checks whether the vehicle speed is equal to zero, at a step 309. Thus, the controller 43 repeats the loop of the steps 301-309 until the vehicle has slowed to a safe speed. When the vehicle comes to a stop, the controller 43 opens both the cutoff valves 20 and 21 at a step 310, turns off the motor 41 at a step 311, and terminates the anti-skid control.

In accordance with the current controlled by the controller 43, the motor 41 rotates the ball nut 40 through the pinion 42, and the ball nut 40 moves the piston rod 38 and the pressurizing piston 31 in the left or right direction in accordance with the rotational direction. In the rightward movement as viewed in FIG. 1, the pressurizing piston 31 forces the assist hydraulic fluid of the pressurizing chamber 33 toward the working (power) chamber 27, and causes the working (power) piston 25 and the control piston 9 to move together to the right. In the leftward movement of the piston rod 38, the pressurizing piston 31 causes the assist fluid in the power chamber 27 to flow toward the pressurizing chamber 33, and thereby causes the power piston 25 and the control piston 9 to move to the left as viewed in FIG. 1. In the rightward stroke, the pressure control piston 9 decreases the brake fluid pressure Pw supplied to the wheel cylinder 5, independently of the master cylinder pressure Pm, by increasing the volume of the first control chamber 14. In the leftward stroke, the control piston 9 increases the brake pressure Pw by decreasing the volume of the first control chamber 14. The control piston 9 varies the volume of the second control chamber 15, too. However, a movable member within the accumulator 22 moves rectilinearly, and the accumulator 22 functions as a means for absorbing changes in the volume of the second control chamber 15, and facilitating the smooth movement of the control piston 9. However, if the fluid in the control chambers is a compressible fluid, then it is possible to omit the accumulator 22.

In the pressure control system of this embodiment, the magnitude of a force required to move the control piston 9 is very small. In the following mathematical expressions, $A_0$ is a pressure receiving area (piston area) of the pressure control piston 9; $A_1$ is a pressure receiving area of the pressurizing piston 31; $A_2$ is a pressure receiving area of the working (power) piston 25 ($A_1 < A_0 < A_2$); $F_0$ is a pushing force of the pressurizing piston 31; $k_1$ is a spring constant of the spring 34; $x_1$ is a deflection of the spring 34; F is a pushing force of the pressure control piston 9; and $P_0$ is the assist fluid pressure supplied to the chamber 27. The following equations are obtained from the balance of forces.

$$F_0 = A_1 P_0 + k_1 x_1 \qquad (1)$$

$$\therefore P_0 = \frac{1}{A_1}(F_0 - k_1 x_1)$$

$$F = A_2 P_0 \qquad (2)$$

$$= \frac{A_2}{A_1}(F_0 - k_1 x_1)$$

The brake fluid pressure Pw is varied by a variation $\Delta P$ (amount of change) with the output of the motor 41 as follows: When the cutoff valves 20 and 21 are closed, the fluid pressure in each of the first and second control chambers 14 and 15 is set equal to an initial value P, and each of the return springs 18 and 19 of a spring constant $k_0$ has an initial deflection $x_0$. When the force F is applied to the control piston 9, the pressure of the first control chamber 14 is varied (decreased) by $\Delta P$, but the pressure of the second control chamber 15 is held equal to the initial value P by the action of the accumulator 22. Therefore, we can obtain the following equation from the balance of forces.

$$F + A_0(P - \Delta P) - k_0(x_0 + \Delta x) = A_0 P - k_0(x_0 - \Delta x) \qquad (3)$$

$$\therefore F = A_0 \Delta P + 2k\Delta x$$

In these equations $\Delta x$ is a displacement of the control piston 9 from the neutral position. Rearrangement of the equations (2) and (3) yields the following relationship between the amount of change $\Delta P$ of the brake pressure, and the input force $F_0$ which can be regarded as an output of the motor 41.

$$\frac{A_2}{A_1}(F_0 - k_1 x_1) = A_0 \Delta P + 2k\Delta x \qquad (4)$$

$$\therefore \Delta P = \frac{1}{A_0}\left(\frac{A_2}{A_1}(F_0 - k_1 x_1) - 2k\Delta x\right)$$

In general, the brake fluid can be regarded as an incompressible fluid. Therefore, it is possible to consider that each of $x_1$ and $\Delta x$ is equal to zero. Consequently, we obtain:

$$\Delta P = \frac{1}{A_0} \frac{A_2}{A_1} F_0 \qquad (5)$$

$$\therefore F_0 = \frac{A_1}{A_2} A_0 \Delta P$$

As evident from the equation (5), the required output $F_0$ of the motor 41 is proportional to the required pressure variation $\Delta P$ alone, and independent of the magnitude of the brake pressure Pw. Therefore, the motor 41 of this embodiment can cause the control piston 9 to move with a relatively small force even if the brake fluid pressure is high. The pressure control system of the embodiment is advantageous for size reduction and energy saving of the motor 41. Especially, the pressure control system of this embodiment produces the pressure variation $\Delta P$ by multiplying the force $F_0$ by $A_2/A_1$, as expressed in the equation (5), so that the mechanical advantage is obtained.

Furthermore, it is possible to reduce the size of the power piston 25 by properly selecting the relationship between the sizes of the pistons 25 and 31. In this embodiment, the assembly of the motor 40 and the pressurizing cylinder 32 is separate from the pressure control assembly 90, so that they can be compactly arranged in a congested space of a vehicle. The pressure control system of this embodiment requires no fluid pressure pump. The assist hydraulic circuit required in the invention is simple in construction, and inexpensive.

Figure 4:
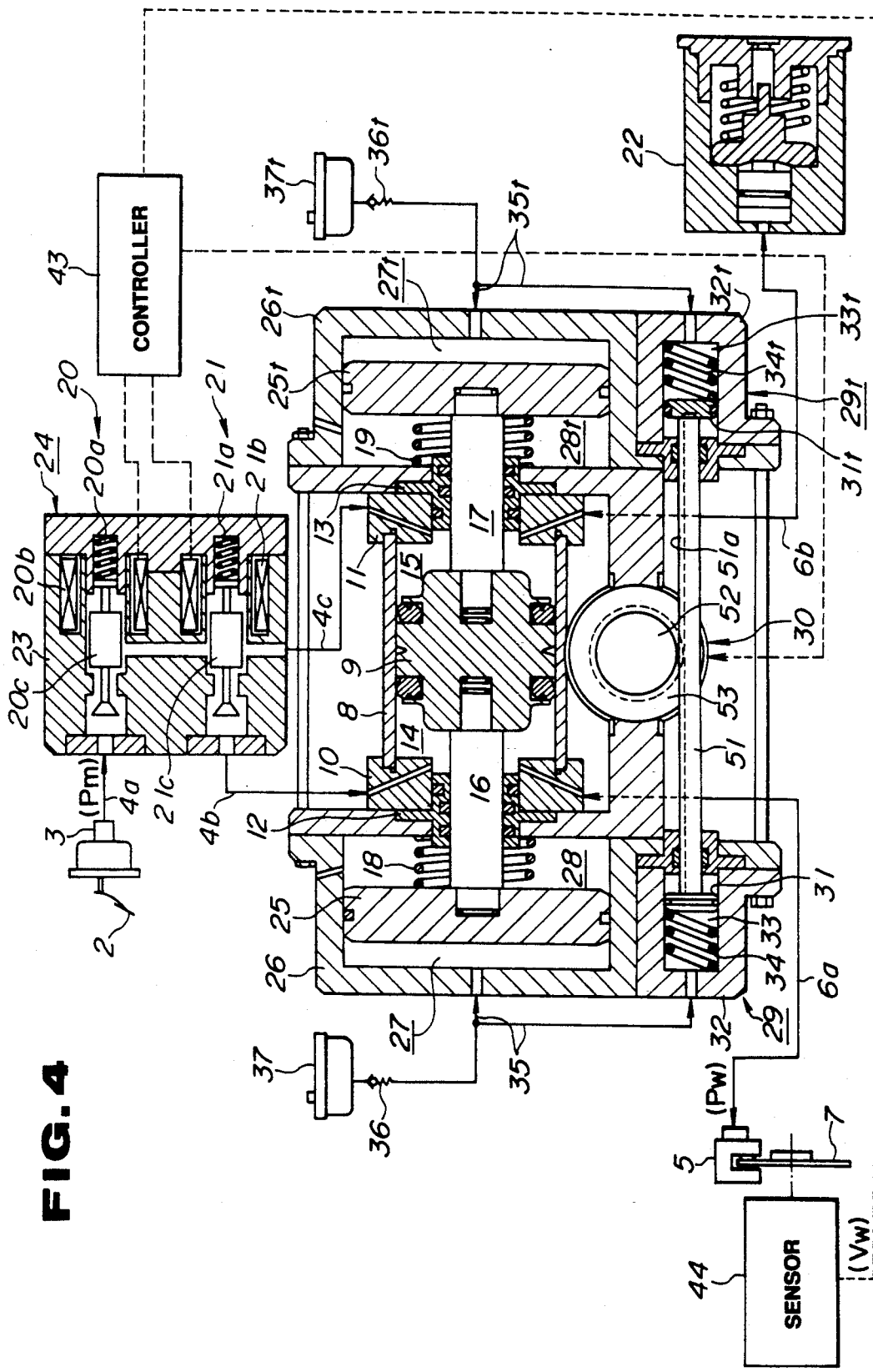
FIG. 4 is a sectional view showing a fluid pressure control system according to a second embodiment of the present invention.

FIG. 4 shows a fluid pressure control system according to a second embodiment of the present invention. A fluid pressure control system of the second embodiment is arranged to perform not only the anti-skid control but also a traction control for preventing acceleration slip (wheel spin).

The assist means 29 of the second embodiment comprises a first hydraulic means comprising a first pressurizing piston 31 slidably fitted in a first pressurizing cylinder housing 32, a second hydraulic means comprising a first power (working) piston 25 slidably fitted in a first power cylinder housing 26, a third hydraulic means comprising a second pressurizing piston 31t slidably fitted in a second pressurizing cylinder housing 32t, and a fourth hydraulic means comprising a second power (working) piston 25t slidably fitted in a second power cylinder housing 26t. The first power piston 25 is connected with the control piston 9 by the first piston rod 16, and the second power piston 25t is connected with the control piston 9 by the second piston rod 17. The first and second means of the second embodiment are substantially identical to those of the first embodiment. The diameter of each power piston is greater than that of the control piston 9. The first and second power pistons 25 and 25t are coaxial with the control piston 9, and the control piston 9 is connected between the first and second power pistons 25 and 25t so that the three pistons axially move together. The second power cylinder housing 26t is fixed to the second end member 11. There are formed a second power chamber 27t and a reference (atmospheric pressure) chamber 28t on both sides of the second power piston 25t, like the second hydraulic means.

The first pressurizing fluid chamber 33 of the first means is connected with the first power chamber 27 by the first assist fluid passage 35, as in the first embodiment. A second pressurizing fluid chamber 33t defined by the second pressurizing cylinder housing 32t and the second pressurizing piston 31t is connected with the second power chamber 25t by a second assist fluid passage 35t. A spring 34t is disposed in the second pressurizing cylinder housing 32t so as to push the piston 31t in such a direction as to increase the volume of the chamber 33t, like the spring 34 of the first means. A second fluid reservoir 37t for fluid replenishment is connected through a second check valve 36t to an intermediate tap point of the second assist passage 35t, like the first reservoir 37.

In this embodiment, the drive means 30 is common to both the first and second pressurizing pistons 31 and 31t. The first and second pressurizing pistons 31 and 31t are connected with each other by a rack 51. A pinion 52 is fixedly mounted on an output shaft of an electric motor 53, and engaged with the teeth of the rack 51.

Figure 5:
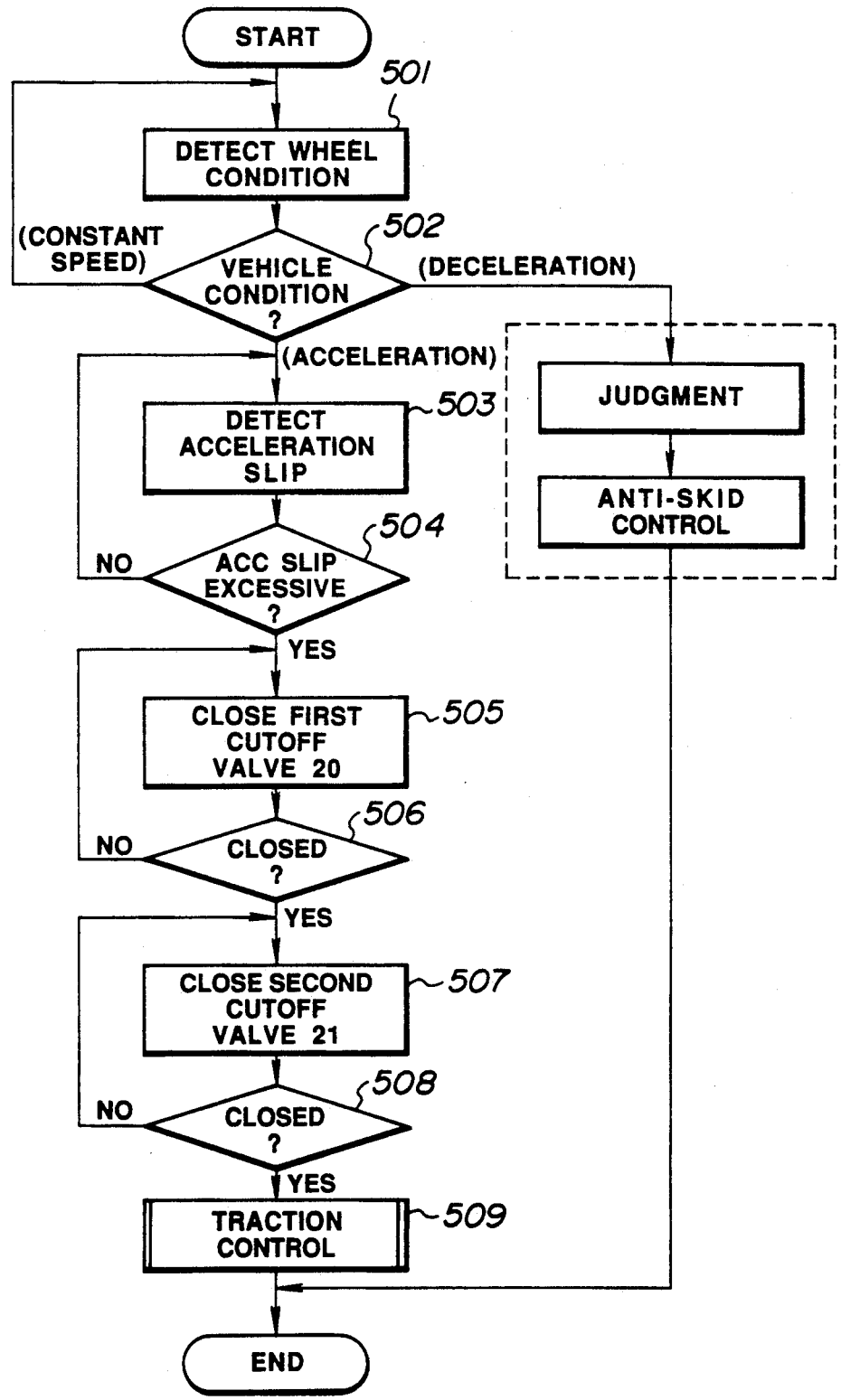
FIGS. 5 and 6 are flowcharts showing a control program performed by a controller shown in FIG. 4.
Figure 6:
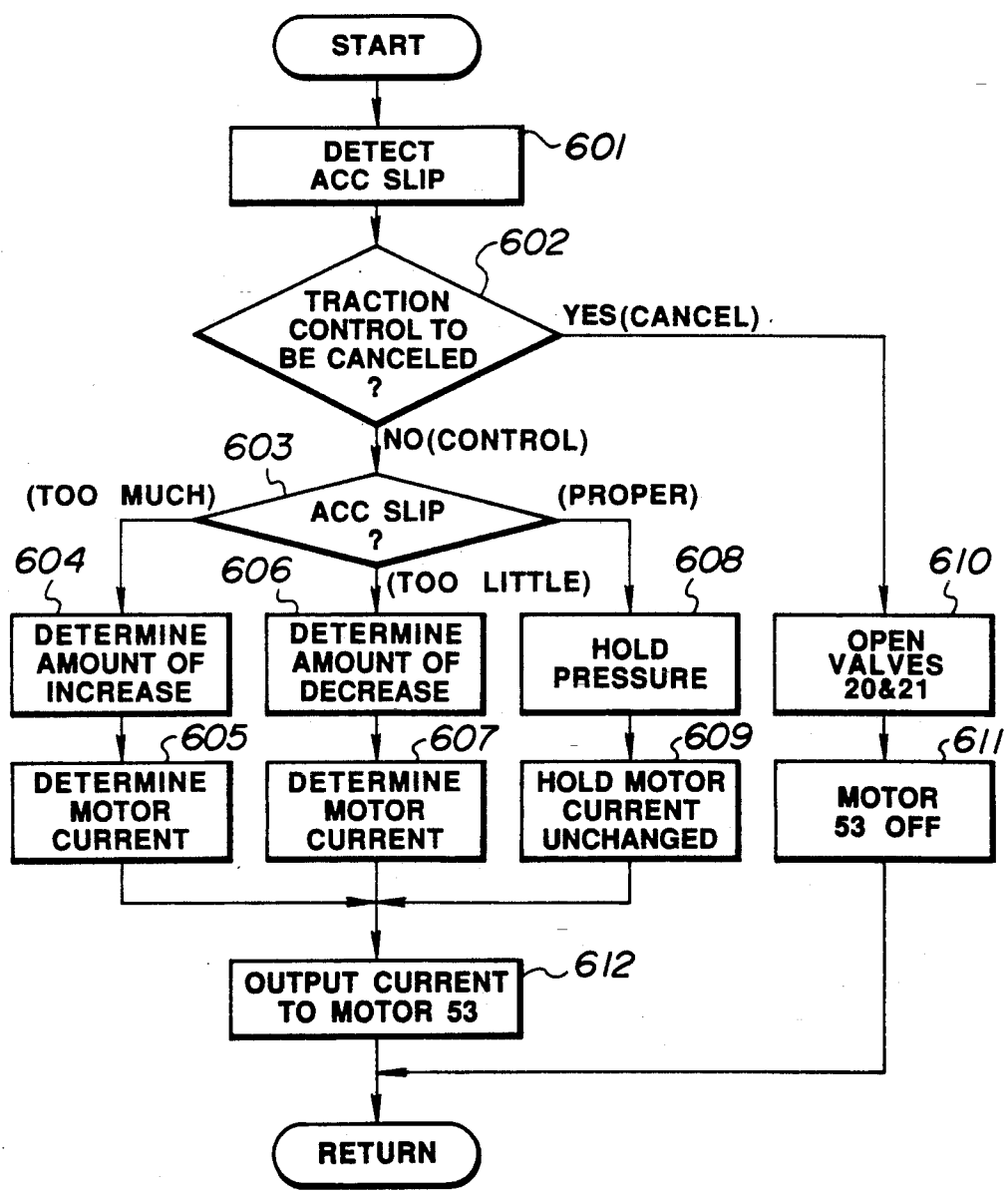

A controller 43 performs the anti-skid control and the traction control as shown in FIGS. 5 and 6.

At a step 501, the controller 43 detects the wheel condition as in the step 201. At a step 502, the controller 43 discriminates among three different vehicle conditions, by using the wheel condition obtained at the step 501. If the vehicle is in a constant speed condition, the controller 43 returns to the step 501, and repeats the loop of the steps 501 and 502. If the vehicle is being decelerated, the controller 43 performs the anti-skid control after a judgement as to the necessity of the anti-skid control, in the same manner as in FIGS. 2 and 3. During the anti-skid control, the controller 43 drives the motor 53 in the forward direction to decrease the brake pressure Pw, and in the reverse direction to increase the brake pressure Pw in a cyclic manner. During the forward rotation of the motor 53, the pinion 52 causes the rack 51 to move together with the piston 31 in the leftward direction as viewed in FIG. 4, and therefore the control piston 9 decreases the brake pressure Pw by moving to the right. During the reverse rotation of the motor 53, the control piston 9 is forced to the left in FIG. 4, and increases the brake pressure Pw.

If the controller 43 considers, at the step 502, that the vehicle is in an accelerating condition, then the controller 43 proceeds from the step 502 to a step 503 to detect an acceleration slip (wheel spin). At a step 504 following the step 503, the controller 43 determines whether the acceleration slip is too much, or not. If the acceleration slip is excessively great, the controller 43 closes the first and second cutoff valves 20 and 21 at steps 505–508 in the same manner as in the steps 203–206, and initiates the traction control to prevent wheel spin at a step 509.

FIG. 6 shows the traction control routine. The controller 43 first detects the acceleration slip of the wheel at a step 601, and then determines, by using the acceleration slip, whether the traction control is to be canceled or not, at a step 602. If the vehicle is in a state to cease the traction control, then the controller 43 opens the first and second cutoff valves 20 and 21 at a step 610, and returns the control piston 9 to the neutral position by turning off the motor 53 at a step 611. If the traction control should be performed, then the controller 43 checks the acceleration slip at a step 603. If the acceleration slip is in a proper range to maximize the driving force, then the controller 43 takes actions to hold the brake pressure Pw at a current value, and hold the motor current at a current value at steps 608 and 609. If the acceleration slip is too small, the controller 43 determines, at a step 606, an amount of decrease of the brake fluid pressure Pw to correct the acceleration slip, and determines the current of the motor 53 corresponding to the amount of pressure increase, at a step 607. If the acceleration slip is excessively great, then the controller 43 determines, at a step 604, an amount of increase of the brake pressure Pw to remove the excess of the acceleration slip, and determines, at a step 605, the motor current corresponding to the amount of pressure increase. At a step 612, the controller 43 takes a necessary action to output the current to the motor 53 according to the determination of the step 605, 607 or 609.

When the acceleration slip is too great, the controller 43 drives the motor 53 in the reverse direction. Therefore, the second pressurizing piston 31t moves together with the rack 51 to the right in FIG. 4 by receiving the force produced by the motor 53, and the second working power piston 25t forces the control piston 9 to move to the left by the action of the assist fluid pressure. Consequently, the control piston 9 increases the brake fluid pressure Pw to remove the excess of the acceleration slip. When the acceleration slip is too small, then the motor 53 is driven in the forward direction, and the control piston 9 decreases the brake pressure Pw to increase the acceleration slip to a desired level. In this way, the control system of this embodiment repeats a cycle of pressure increase and decrease, and automatically controls the degree of the acceleration slip so as to maximize the driving force of the wheels.

Figure 7:
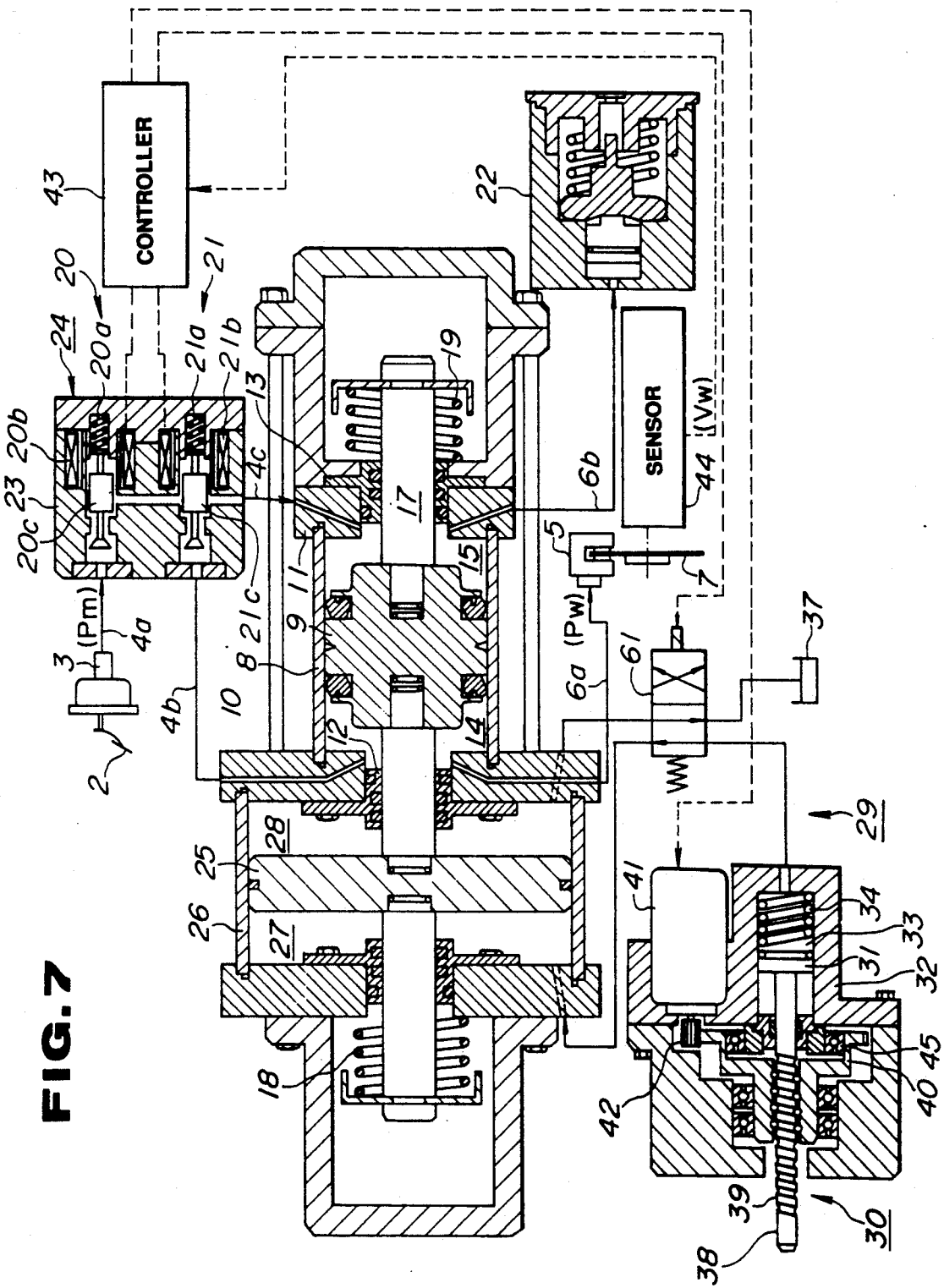
FIG. 7 is a sectional view showing a fluid pressure control system according to a third embodiment of the present invention.

FIG. 7 shows a fluid pressure control system according to a third embodiment of the invention. The control system of this embodiment is designed to perform both the anti-skid control and the traction control as in the second embodiment. However, the assist means 29 of the third embodiment has a single pressurizing piston 31, a single working power piston 25 of a double acting type, and an electromagnetic selector valve 61 serving as a selector valve means, unlike the second embodiment. First and second working power chambers 27 and 28 are formed on both sides of the double acting power piston 25. The selector valve 61 is interposed between the pressurizing chamber 33 and the double acting power cylinder having the piston 25. The selector valve 61 has a first valve position for connecting the first power chamber 27 with the pressurizing chamber 33, and the second power chamber 28 with a fluid reservoir 37, and a second valve position for connecting the first power chamber 27 with the reservoir 37, and the second power chamber 28 with the pressurizing chamber 33. When the selector valve 61 is in the off state, the selector valve 61 is held in the first valve position. When energized, the selector valve 61 is put in the second valve position to connect the second power chamber 28 with the pressurizing chamber 33.

Figure 8:
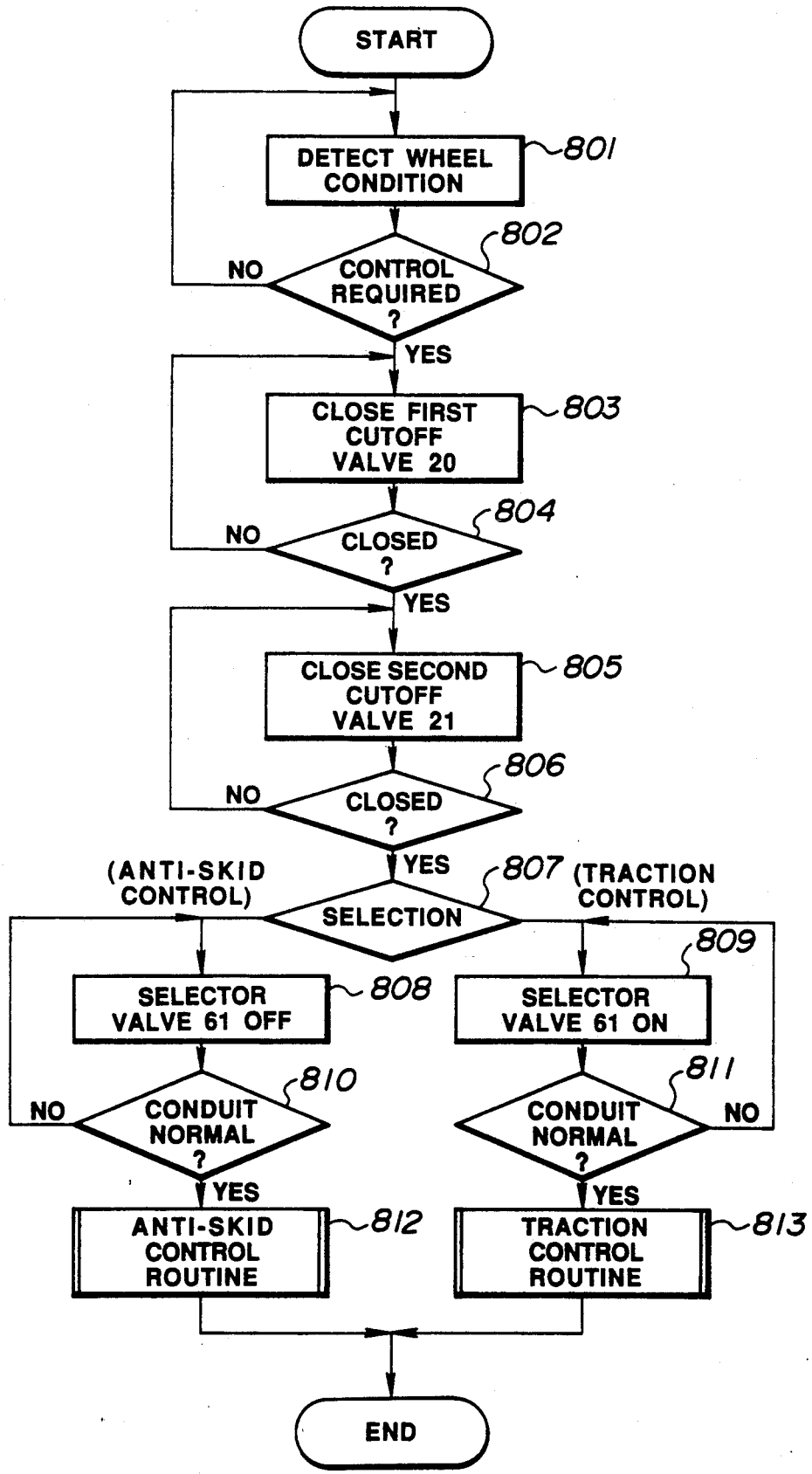
FIG. 8 is a flowchart showing a control program performed by a controller shown in FIG. 7.

The controller 43 of the third embodiment performs the anti-skid control and the traction control according to a control program shown in FIG. 8. First, the controller 43 detects the wheel revolving state at a step 801 in the same manner as in the step 501, and determines, by using the detected wheel condition, whether the anti-skid control or the traction control is required or not, at a step 802. If either of the anti-skid control and the traction control is required, the controller 43 closes the first and second cutoff valves 20 and 21 one after another at steps 803–806, and determines, at a step 807, which control is required.

When the vehicle is in a state requiring the anti-skid control, the controller 43 turns off the electromagnetic selector valve 61 at a step 808. Therefore, the first power chamber 27 is put in fluid communication with the pressurzing chamber 33, and the second power chamber 28 is put in fluid communication with the reservoir 37. Then, the controller checks, at a step 810, whether the fluid passage is normal or not, and enters an anti-skid control routine similar to the routine shown in FIG. 3, at a step 812.

When the traction control is required, the controller 43 turns on the electromagnetic selector valve 61 at a step 809. Therefore, the first power chamber 27 is connected with the reservoir 37, and the second power chamber 28 is connected with the pressurzing chamber 33. Then, if the fluid pressure conduit is not abnormal, the controller 43 performs a traction control routine similar to the routine shown in FIG. 6 (steps 811 and 813).

Figure 9:
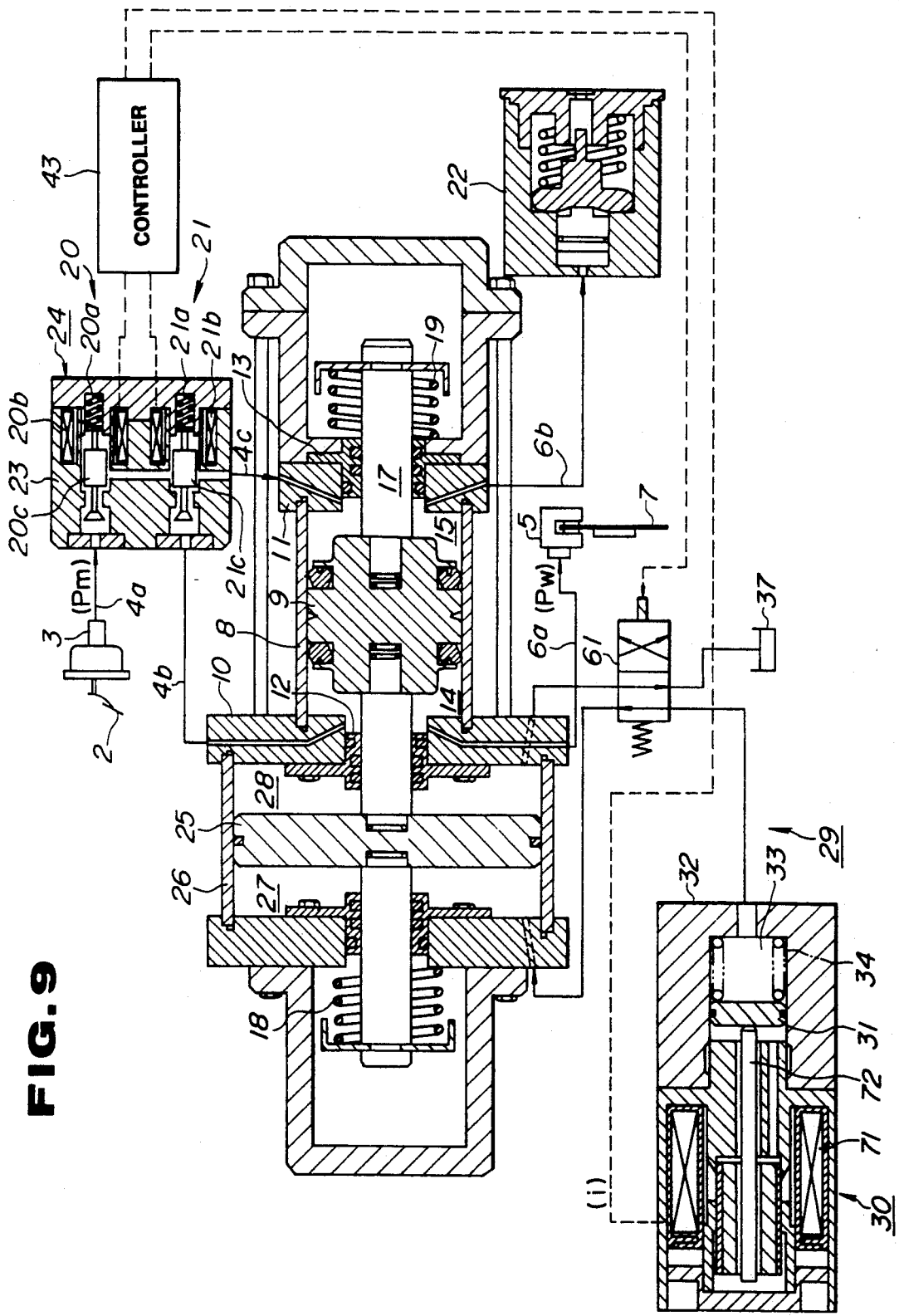
FIG. 9 is a sectional view showing a fluid pressure control system according to a fourth embodiment of the present invention.
Figure 10:
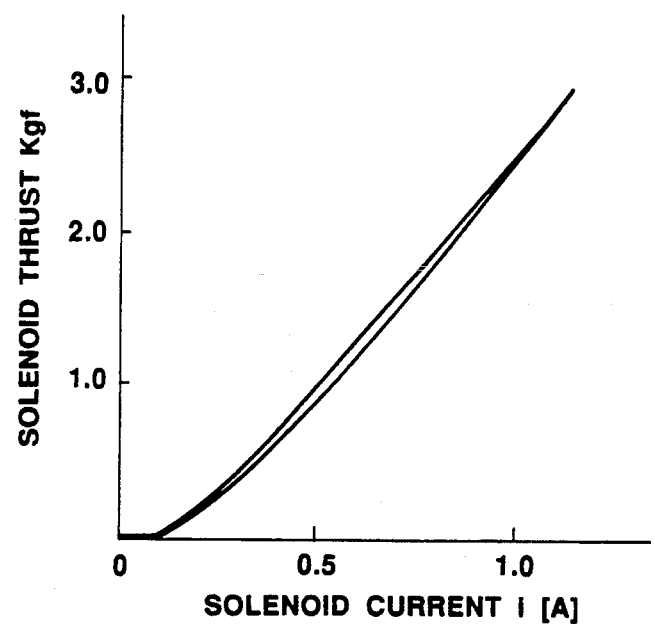
FIG. 10 is a graph showing an operating characteristic of a solenoid used in the fourth embodiment.
Figure 11:
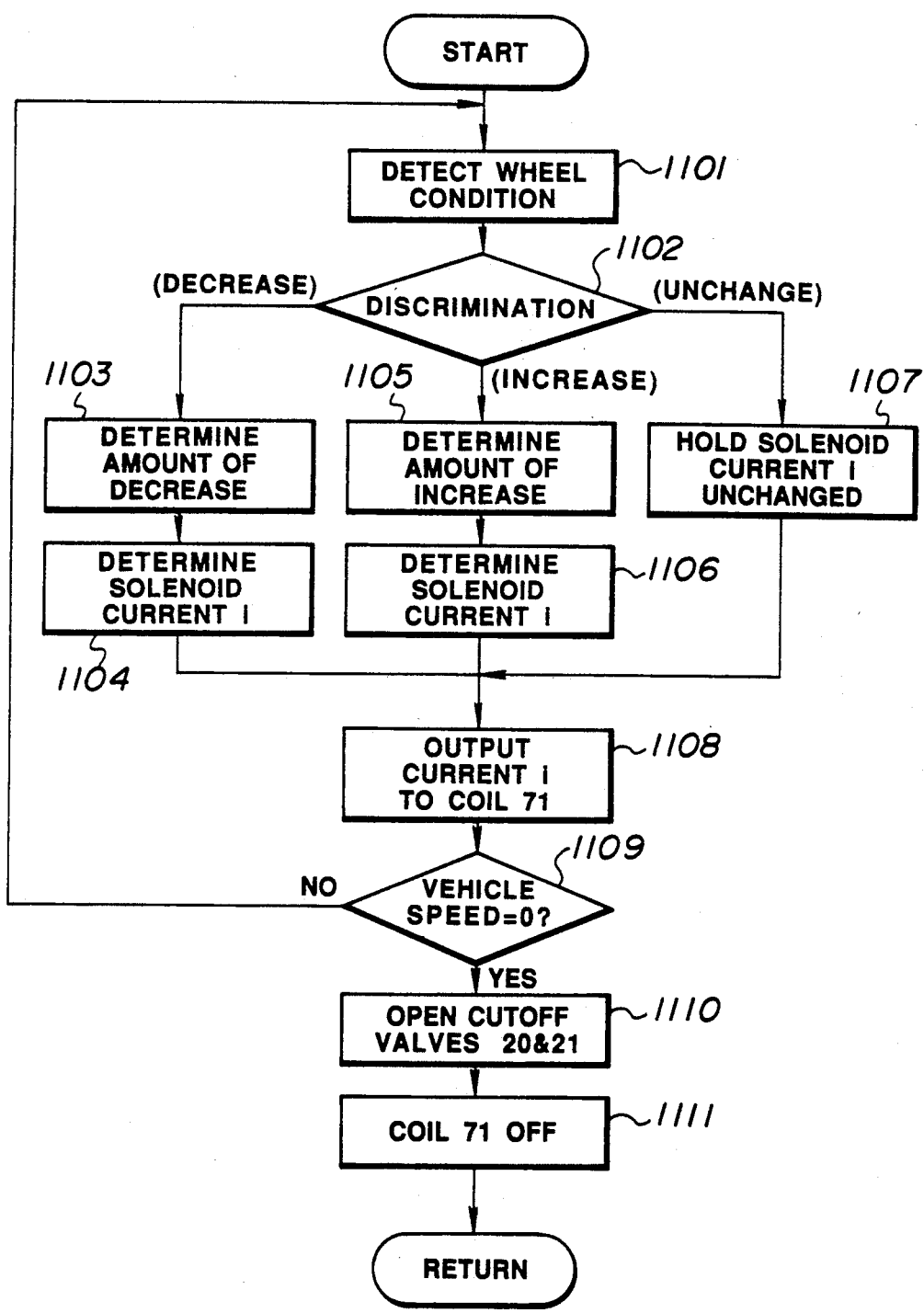
FIGS. 11 and 12 are flowcharts showing a control program performed by a controller shown in FIG. 9.
Figure 12:
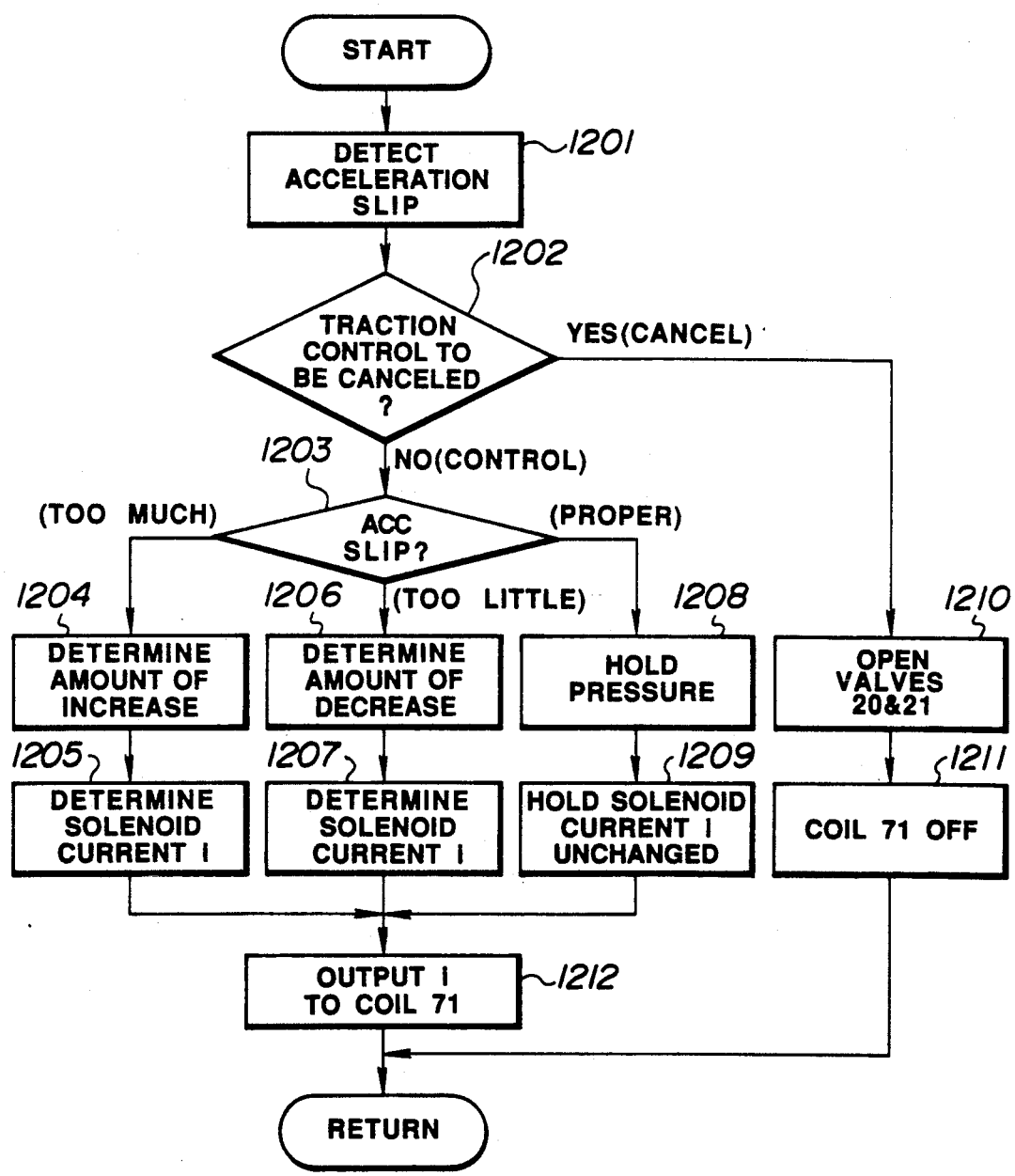

FIG. 9 shows a fluid pressure control system according to a fourth embodiment of the invention. This embodiment employs a proportional solenoid, as the drive means 30, instead of the electric motor 41. As shown in FIG. 9, the hydraulic system of the fourth embodiment is substantially identical to the hydraulic system shown in FIG. 7. The proportional solenoid device of the fourth embodiment includes a coil 71 and a push rod (or plunger) 72. In accordance with a solenoid drive current i supplied to the coil 71, the push rod 72 applies a force (or thrust) on the pressurizing piston 31. FIG. 10 shows a relationship between the force applied on the pressurizing piston 31 and the solenoid drive current i of the proportional solenoid device of this example. Therefore, the controller 43 of this embodiment can control the brake fluid pressure by varying the solenoid drive current i. The controller 43 performs the anti-skid control and the traction control by executing a main routine similar to the routine shown in FIG. 8, a subroutine of FIG. 11 similar to the anti-skid control subroutine shown in FIG. 3, and a subroutine of FIG. 12 similar to the traction control subroutine shown in FIG. 6.

It is possible to employ, as the drive means, one or more piezoelectric elements instead of the motor or the proportional solenoid.

We claim:

1. A fluid pressure control system comprising:
 a pressure control cylinder means for controlling a pressure of a confined fluid, said pressure control cylinder means comprising a control cylinder housing defining a first control fluid chamber and a second control fluid chamber, and a control piston which separates said first and second control fluid chambers from each other and which varies a volume of said first control chamber to control the pressure;
 a drive means for producing a first mechanical force;
 an assist means for producing a first assist hydraulic pressure by receiving said first mechanical force from said drive means, and converting said first assist hydraulic pressure into a second mechanical force for actuating said control piston;
 a main hydraulic actuator means which is fluidly connected with said first control chamber of said control cylinder means;
 a fluid pressure supplying means for supplying a fluid pressure to said main hydraulic actuator means to operate said main hydraulic actuator means by the fluid pressure; and
 a cutoff valve means for opening said first and second control chambers so that both control chambers are fluidly connected with said supplying means, and for closing said first and second control chambers so that said first control chamber and said main hydraulic actuator means form a first closed hydraulic circuit section isolated from each of said supplying means and said second control chamber, and said second control chamber forms a second closed hydraulic circuit section which is isolated from each of said first control chamber and said supplying means.

2. A fluid pressure control system according to claim 1 wherein said assist means comprises a first means for receiving said first mechanical force from said drive means and producing said first assist hydraulic pressure, and a second means which comprises a linear hydraulic actuator for moving said control piston rectilinearly by receiving said first assist hydraulic pressure from said first means.

3. A fluid pressure control system according to claim 2 wherein said drive means includes a motor means for converting electric energy into mechanical energy.

4. A fluid pressure control system according to claim 3 wherein said first means comprises a first pressurizing cylinder housing defining a first pressurizing fluid chamber, and a first pressurizing piston which is driven by said motor means and which produces said first assist hydraulic pressure by varying a volume of said first pressurizing fluid chamber; and said second means comprises a first working cylinder housing defining a first working fluid chamber which is in fluid communication with said first pressurizing fluid chamber, and a first working piston for pushing and pulling said control piston.

5. A fluid pressure control system according to claim 4 wherein a piston area of said first working piston is larger than a piston area of said control piston, and a piston area of said first pressurizing piston is smaller than the piston area of said control piston.

6. A fluid pressure control system according to claim 5 wherein said first working piston is coaxial with said control piston, and connected with said control piston by a first piston rod so that said control piston and said first working piston move axially as a unit; said second means of said assist means is arranged so that said first assist hydraulic pressure in said first working chamber pushes said first working piston in a first axial direction so as to increase the volume of said first control chamber; and said control cylinder means further comprises a first spring means for pushing said first piston rod in a second direction so as to decrease the volume of said first control chamber.

7. A fluid pressure control system according to claim 5 wherein said cutoff valve means comprises a cutoff valve housing defining an inlet port communicating with said fluid pressure supplying means, a first outlet port communicating with said first control chamber, a second outlet port communicating with said second control chamber, a movable means which is put in an open state to fluidly connect said inlet port to both of said first and second outlet ports, and a closed state to isolate said first and second outlet ports from each other and further from said inlet port; said first closed hydraulic circuit section being in fluid communication with said first outlet port and comprising said first control chamber and said main hydraulic actuator means; said second closed hydraulic circuit section being in fluid communication with said second outlet port and comprising said second control chamber.

8. A fluid pressure control system according to claim 7 wherein said cutoff valve means comprises a first cutoff valve for isolating said first and second control chambers from the pressure source, and a second cutoff valve for isolating said first and second control chambers from each other.

9. A fluid pressure control system according to claim 8 wherein said control cylinder means further comprises a second spring means for holding said control piston in a neutral position; each of said first and second cutoff valves is a normally open solenoid valve comprising a movable valve element, a spring for normally holding said valve element in an open position, and a solenoid for putting said valve element in a closed position when said solenoid is energized; said pressure control system further comprises a controller means for controlling said motor means and said cutoff valve means by producing electric signals; said controller means includes a means for performing a first operation to close said first cutoff valve, and then initiating a second operation to close said second cutoff valve after said first operation has been finished; said motor means comprises an electric rotary motor and a speed reducing gear arrangement for transmitting power produced by said electric motor to said first means of said assist means; said first working chamber is connected with said first pressurizing chamber by an assist fluid passage which is connected with a fluid reservoir through a check valve; and said working cylinder housing further defines an atmospheric pressure chamber which is separated from the first working chamber by said first working piston.

10. A fluid pressure control system according to claim 9 wherein said main hydraulic actuator means comprises a wheel cylinder for converting hydraulic fluid pressure to mechanical force for actuation of a brake of a vehicle; said supplying means comprises a brake master cylinder; said pressure control system further comprises a hydraulic accumulator which is fluidly connected with said second control chamber, and a sensor means for sensing an operating condition of the vehicle and sending a signal to said controller means; said sensor means comprising a wheel speed sensor for sensing angular rotation of a wheel of the vehicle; and said controller means comprises an electronic logic controller for automatically controlling a degree of wheel slip of the vehicle by sending control signals to said cut off valve means and said drive means.

11. A fluid pressure control system according to claim 2 wherein said assist means further comprises a third means for receiving said first mechanical force from said drive means and producing a second assist hydraulic pressure, and a fourth means which comprises a linear hydraulic actuator for moving said control piston by receiving said second assist pressure from said third means; and said control piston is connected between said second and fourth means so that said first assist pressure in said second means applies a force on said control piston in a first direction and said second assist pressure in said fourth means applies a force on said control piston in a second direction opposite to said first direction.

12. A fluid pressure control system according to claim 11 wherein said linear hydraulic actuator of said second means is a single acting type having a power stroke in said first direction only, and said linear hydraulic actuator of said fourth means is a single acting type having a power stroke only in said second direction opposite to said first direction.

13. A fluid pressure control system according to claim 12 wherein said first means of said assist means comprises a first pressurizing cylinder housing defining a first pressurizing fluid chamber, and a first pressurizing piston which is moved by said drive means and which produces said first assist pressure by varying a volume of said first pressurizing chamber; said second means comprises a first working cylinder housing defining a first working fluid chamber which is in fluid communication with said first pressurizing chamber, and a first working piston for pushing said control piston in said first direction; said third means comprises a second pressurizing cylinder housing defining a second pressurizing fluid chamber, and a second pressurizing piston for producing a second assist fluid pressure by varying a volume of said second pressurizing chamber; and said fourth means comprises a second working cylinder housing defining a second working fluid chamber which is in fluid communication with said second pressurizing chamber, and a second working piston for pushing said control piston in said second direction.

14. A fluid pressure control system according to claim 13 wherein said drive means includes a motor means for converting electric energy into mechanical energy, said motor means comprising an electric rotary motor; a speed reducing gear arrangement comprising a pinion driven by said motor; and a rack which is in engagement with said pinion and which has a first end connected with said first pressurizing piston and a second end connected with said second pressurizing piston.

15. A fluid pressure control system according to claim 2 wherein said linear hydraulic actuator of said second means is a double acting type actuator having first and second working fluid chambers separated by a working piston; and said assist means further comprises a selector valve means having a first position to introduce said first assist hydraulic pressure from said first means to said first working chamber and a second position to introduce said first assist hydraulic pressure to said second working chamber.

16. A fluid pressure control system according to claim 3 wherein said motor means comprises a solenoid device which comprises a coil and a movable plunger for applying said first mechanical force on said first means of said assist means.

17. A fluid pressure control system comprising:
a pressure control cylinder means for controlling a pressure of a confined fluid, said pressure control cylinder means comprising a control cylinder housing defining a first control fluid chamber and a second control fluid chamber, and a control piston which separates said first and second control fluid chambers from each other and which varies a volume of said first control chamber to control the pressure;
a drive means for producing a first mechanical force;
an assist means for producing a first assist hydraulic pressure by receiving said first mechanical force from said drive means, and converting said first assist hydraulic pressure into a second mechanical force for actuating said control piston;
a main hydraulic actuator means which is fluidly connected with said first control chamber of said control cylinder means;
a fluid pressure supplying means for supplying a fluid pressure to said main hydraulic actuator means to operate said main actuator means by the fluid pressure;
a cutoff valve means for opening said first and second control chambers so that both control chambers are fluidly connected with said supplying means, and for closing said first and second control chambers so that said first control chamber and said main hydraulic actuator means form a first closed hydraulic circuit section isolated from each of said supplying means and said second control chamber, and said second control chamber forms a second closed hydraulic circuit section which is isolated from each of said first control chamber and said supplying means;

said assist means comprises a first means for receiving said first mechanical force from said drive means and producing said first assist hydraulic pressure, and a second means which comprises a linear hydraulic actuator for moving said control piston rectilinearly by receiving said first assist hydraulic pressure from said first means;

said drive means includes a motor means for converting electric energy into mechanical energy;

said first means comprises a first pressurizing cylinder housing defining a first pressurizing fluid chamber, and a first pressurizing piston which is driven by said motor means and which produces said first assist hydraulic pressure by varying a volume of said first pressurizing fluid chamber; and said second means comprises a first working cylinder housing defining a first working fluid chamber which is in fluid communication with said first pressurizing fluid chamber, and a first working piston for pushing and pulling said control piston; and wherein a piston area of said first working piston is larger than a piston area of said control piston, and a piston area of said first pressurizing piston is smaller than the piston area of said control piston.

18. A fluid pressure control system comprising:
a pressure control cylinder means for controlling a pressure of a confined fluid, said pressure control cylinder means comprising a control cylinder housing defining a first control fluid chamber and a second control fluid chamber, and a control piston which separates said first and second control fluid chambers from each other and which varies a volume of said first control chamber to control the pressure;

a drive means for producing a first mechanical force;

an assist means for producing a first assist hydraulic pressure by receiving said first mechanical force from said drive means, and converting said first assist hydraulic pressure into a second mechanical force for actuating said control piston;

said assist means comprises a first means for receiving said first mechanical force from said drive means and producing said first assist hydraulic pressure, a second means which comprises a linear hydraulic actuator for moving said control piston rectilinearly by receiving said first assist hydraulic pressure from said first means, a third means for receiving said first mechanical force from said drive means and producing a second assist hydraulic pressure, and a fourth means which comprises a linear hydraulic actuator for moving said control piston by receiving said second assist pressure from said third means; and said control piston is connected between said second and fourth means so that said first assist pressure in said second means applies a force on said control piston in a first direction and said second assist pressure in said fourth means applies a force on said control piston in a second direction opposite to said first direction.

* * * * *